United States Patent
Lauf et al.

(10) Patent No.: US 6,515,399 B1
(45) Date of Patent: Feb. 4, 2003

(54) ELECTRIC MOTOR-AND-GEAR ASSEMBLY FOR VEHICLE ACCESSORIES

(75) Inventors: Detlef Lauf, Renchen (DE); Ernst Fischer, Gernsbach (DE); Hansjoerg Karcher, Buehlertal (DE); Juergen Herp, Buehlertal (DE); Erik Maurer, Buehlertal (DE); Andreas Wiegert, Kappelrodeck (DE); Christian Schneider, Buehlertal (DE); Bernd Bock, Buehlertal (DE); Richard Hurst, Offenburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/622,029

(22) PCT Filed: Oct. 5, 1999

(86) PCT No.: PCT/DE99/03195

§ 371 (c)(1),
(2), (4) Date: Oct. 13, 2000

(87) PCT Pub. No.: WO00/36729

PCT Pub. Date: Jun. 22, 2000

(30) Foreign Application Priority Data

Dec. 17, 1998 (DE) ......................... 198 58 233

(51) Int. Cl.[7] .................. H02K 7/10; H02K 49/00; H02K 13/00; H01R 39/38; H01R 39/40
(52) U.S. Cl. ................... 310/239; 310/99; 310/238; 310/242; 310/245
(58) Field of Search ................. 310/99, 239, 242, 310/244, 245, 246, 247

(56) References Cited

U.S. PATENT DOCUMENTS

| | | | | |
|---|---|---|---|---|
| 3,968,391 A | * | 7/1976 | Blank ........................ | 310/240 |
| 4,296,346 A | * | 10/1981 | Ooki et al. ................. | 310/242 |
| 4,366,403 A | * | 12/1982 | Simpson et al. ............ | 310/239 |
| 4,593,220 A | * | 6/1986 | Cousins et al. ............. | 310/239 |
| 4,600,850 A | * | 7/1986 | Mazzorana et al. ......... | 310/242 |
| 4,607,184 A | * | 8/1986 | Takahashi et al. .......... | 310/247 |
| 4,638,204 A | * | 1/1987 | Kirchner et al. ............ | 310/239 |
| 4,713,568 A | * | 12/1987 | Adam et al. ................ | 310/112 |
| 5,040,950 A | * | 8/1991 | Dalquist, III et al. ....... | 417/234 |
| 5,175,464 A | * | 12/1992 | Smith ......................... | 310/239 |
| 5,291,088 A | * | 3/1994 | Adam et al. ................. | 310/88 |
| 5,397,952 A | * | 3/1995 | Decker et al. .............. | 310/242 |
| 5,463,264 A | * | 10/1995 | Koenitzer ................... | 310/242 |
| 5,506,461 A | * | 4/1996 | Okabe ........................ | 310/239 |
| 5,648,695 A | * | 7/1997 | Yamaguchi et al. ........ | 310/242 |
| 5,773,907 A | * | 6/1998 | Rubinchik ................... | 310/248 |
| 5,796,201 A | * | 8/1998 | Kamitani et al. ........... | 310/194 |
| 5,877,575 A | * | 3/1999 | Nara et al. .................. | 310/239 |
| 5,931,620 A | * | 8/1999 | Sugai et al. ................. | 411/82 |
| 6,163,096 A | * | 12/2000 | Michenfelder et al. ..... | 310/239 |

FOREIGN PATENT DOCUMENTS

EP 195929 A2 * 10/1986

* cited by examiner

*Primary Examiner*—Nestor Ramirez
*Assistant Examiner*—Julio C. Gonzalez
(74) *Attorney, Agent, or Firm*—Ronald E. Greigg

(57) ABSTRACT

An electric motor-and-gear assembly for driving vehicle aggregates such as windshield and rear window wipers, power-window units and the like, having a transmission housing that can be closed by a housing cover. A motor housing that contains a commutator motor whose commutator protrudes into the transmission housing and cooperates with a brush holder fixed in the transmission housing. For the sake of a more reasonably priced manufacture and a time-saving, more rapid assembly of the brush holder, the commutator brushes are embodied as hammer brushes with spring leaf actuators prestressed toward the commutator. The spring leaf actuator are respectively fixed with their one actuator end in a U-shaped plastic carrying part of the brush holder, which is inserted into the transmission housing radial to the commutator, through the housing opening and is positioned in the transmission housing in a positively engaging manner by means of the housing cover.

13 Claims, 4 Drawing Sheets

ELECTRIC MOTOR-AND-GEAR ASSEMBLY FOR VEHICLE ACCESSORIES

PRIOR ART

The invention is based on an electric motor-and-gear assembly for driving vehicle aggregates such as windshield and rear window wipers, power-window units and the like.

A known motor-and-gear assembly for power-window units in motor vehicles (DE 90 13 006 U1) has a transmission housing which adjoins the commutator end of the commutator motor and into which the elongated motor shaft protrudes as a transmission drive shaft (worm shaft). A printed circuit board is disposed in an electronic housing and is electrically connected to an external connector plug and commutator brushes as well as components of a set of motor electronics. The printed circuit board has a one-piece receiving part for the brush holder and a one-piece receiving part for the connector plug. The electrical connections of the components, the commutator brushes, and the connector plug are contacted by the strip conductors of the printed circuit board. The commutator brushes are disposed diametrically opposed on the commutator and are respectively held so that they can move radially in a tubular brush holder embodied in the brush holder. The electronic housing is a component of the transmission housing and is closed by an electronic housing cover that is of one piece with the transmission housing.

ADVANTAGES OF THE INVENTION

The electric motor-and-gear assembly according to the invention for driving vehicle aggregates has the advantage that the embodiment of the brush carrier as a U-shaped carrying piece on the one hand and the embodiment of the commutator brushes as so-called hammer brushes on the other hand assures an inexpensive manufacture of the brush holder and a time-saving, simple assembly since after the motor-and-gear assembly has been completely assembled, the brush holder can be slid radially over the commutator through the housing opening in the transmission housing in a single work cycle and is thereby positioned in the transmission housing in a highly precise manner. No other manipulations or adjusting measures are required. Since the hammer brushes are affixed to the brush holder, their sliding bodies, also called carbon strips, also rest in a precise position on the circumference of the commutator after the insertion of the brush holder. When the transmission is closed by means of the transmission cover, the brush holder is securely fixed without additional steps.

The hammer brushes have the advantage that the spring steel sheets have a very favorable ability to dissipate heat from the sliding bodies and therefore the carrying part itself does not have to assume any heat-dissipating function so that the carrying part can be inexpensively made of plastic. The manufacture of the carrying part of plastic makes it possible, through the injection molding of additional pockets onto the carrying part, for components for the motor electronics, such as thermal circuit breakers, interference suppression elements (capacitor, throttle), to be inserted into the brush holder itself and therefore permits a simplified assembly after a prior assembly of the brush holder.

Advantageous improvements and updates of the electric motor-and-gear assembly are possible by means of the measures set forth hereinafter.

According to a preferred embodiment of the invention, at least one elastomer element is disposed between the underside of the carrying part oriented toward the transmission cover and the inside of the transmission cover. This elastomer element is preferably part of a seal, which is injection molded onto the transmission cover and is made, for example, of rubber-like material. These measures achieve an extensive decoupling of the brush holder from the transmission cover, which is also made of plastic, and thus achieves a noise reduction.

According to an advantageous embodiment of the invention, assembly aids for sliding the brush holder onto the commutator are embodied on the free ends of the spring leaf actuators of the hammer brushes. These assembly aids, which are preferably embodied as projections with insertion bevels and are inclined toward the outside from the end of the spring leaf actuators, make it significantly easier to slide the hammer brushes onto the commutator and the assembly of the brush holder can be executed without auxiliary tools.

According to an advantageous embodiment of the invention, the pigtails for the hammer brushes are fixed in clamping forks embodied on the carrying part, preferably of one piece with the carrying part. This achieves an assembly-facilitating fixing of the pigtails which is imperative for a noise reduction and increased service life of the motor.

BRIEF DESCRIPTION OF THE DRAWINGS

The invention will be explained in detail in the description below in conjunction with an exemplary embodiment shown in the drawings.

DESCRIPTION OF THE EXEMPLARY EMBODIMENT

Figure 1:
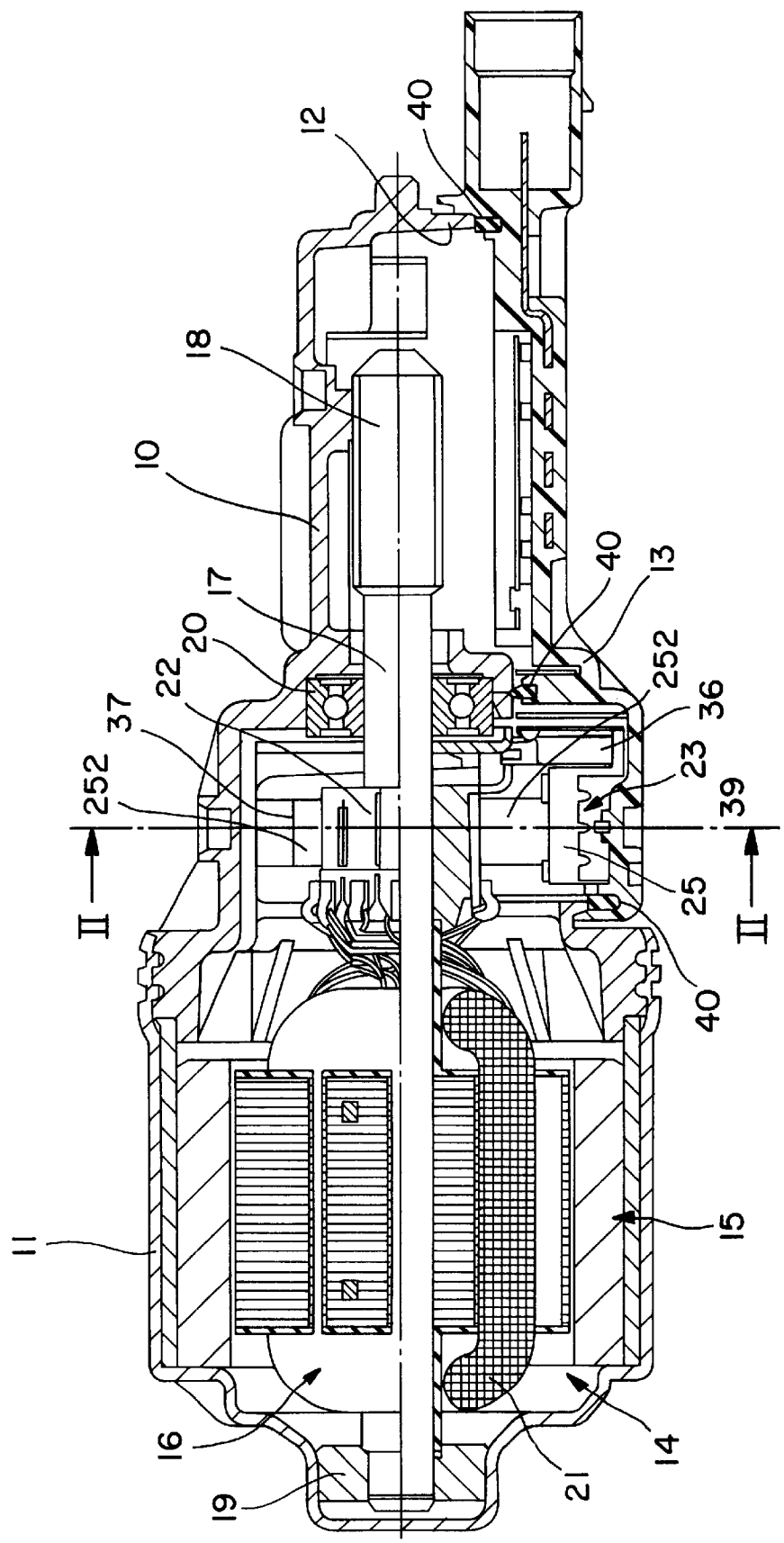
FIG. 1 shows a longitudinal section through a motor-and gear assembly for a vehicle windshield wiper.

The electric motor-and-gear assembly depicted in the longitudinal section in FIG. 1, which is for a windshield wiper in motor vehicles, as an exemplary embodiment for a general vehicle aggregate, has a transmission housing 10 and a motor housing 11 attached to this transmission housing 10. The transmission housing 10, which contains a transmission not shown here, has a mounting opening 12 that is closed by a housing cover 13, with the interposition of a seal 40. A commutator motor 14 with a stator 15 and rotor 16 is contained in the motor housing 11. An elongated rotor shaft 17, supports the rotor 16, and protrudes into the transmission housing 10 as a transmission drive shaft of the transmission that carries a worm gear 18. The transmission drive shaft is supported so that the transmission draft shaft can rotate in a slide bearing 19 in the motor housing 11 and in a roller bearing 20 in the transmission housing 10. A rotor winding 21 contained in the rotor 16 is connected in an electrically conductive fashion to the commutator lamellas of a commutator 22 connected to the rotor shaft 17 in a non-rotatable fashion. A brush holder 23 with three commutator brushes 24 (FIG. 3) for the operation of the commutator motor 14 at two different speeds is positioned and fixed in the transmission housing 10 in a positively engaging manner.

Figure 3:
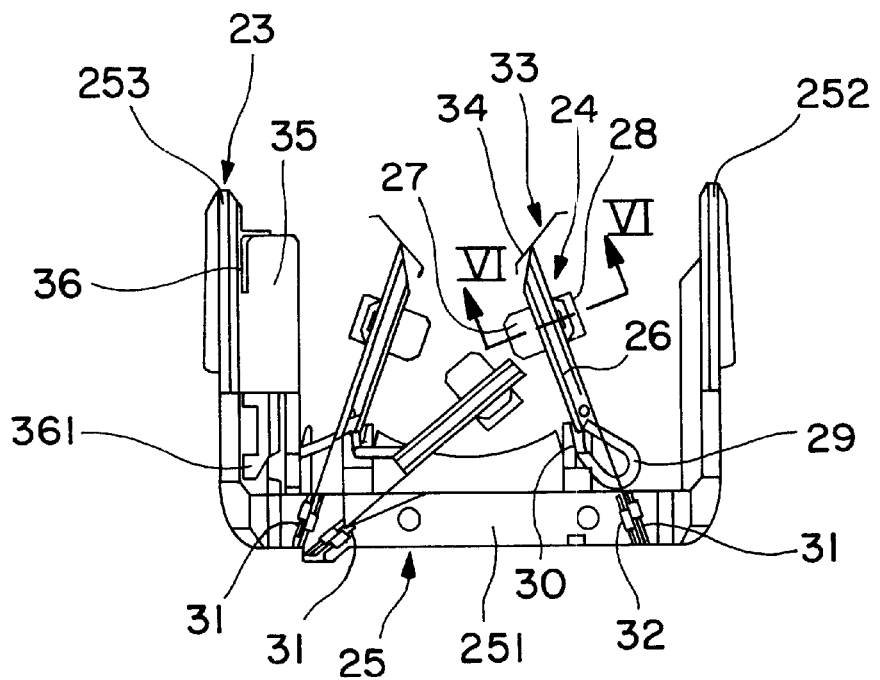
FIG. 3 shows a side view of a brush holder in the motor-and-gear assembly according to FIG. 1, FIGS. 4 and 5 each show a depiction equivalent to the one in FIG. 3 of the brush holder according to two additional exemplary embodiments.
Figure 6:
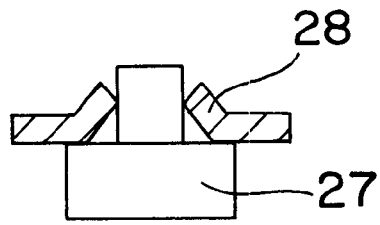
FIG. 6 illustrates a clip set forth in FIG. 3 which are shown on a larger scale.

As can be seen from FIG. 3, the brush holder 23, which can only be seen in a sectional view in FIG. 1, has a U-shaped carrying part 25 made of plastic to which the three commutator brushes 24 are connected. The three commutator brushes are embodied as hammer brushes. Each hammer brush 24 has a spring leaf actuator 26 that is prestressed toward the commutator 22 and is fastened with one actuator end in the yoke 251 of the U-shaped carrying part 25 and at another actuator end, carries a sliding body for the current consumption or current supply to or from the commutator 22, such as a carbon strip 27. The carbon strip 27, which is pressed against the circumference of the commutator 22 by the spring force of the spring leaf actuator 26, is slid through a recess in the spring leaf actuator 26 from the back side of the spring leaf actuator 26 oriented away from the commutator 22 and is prevented from moving axially by means of a clip 28 embodied on the spring leaf actuator 26. FIG. 6 has been added to illustrate the clips 28 and carbon strip 27 in an enlarged view. Each carbon strip 27 is connected in a known fashion by means of a pigtail 29 to a connector plug not shown. The pigtail 29 can either be sintered into the carbon strip 27 or can be bonded onto the spring leaf actuator 26. In order to fix the pigtail 29, it is clamped in a clamping fork 30 that is injection molded onto the yoke 251 of the U-shaped carrying part 25.

The fixing of the spring leaf actuators 26 in the carrying part 25 can take place in different ways. In the exemplary embodiment of FIG. 3, the carrying part 25 has a total of three slots 31 which are let into the carrying part 25 from one side and predetermine the position of the spring leaf actuators 26 by means of their alignment in relation to the axis of the brush holder 23. The three spring leaf actuators 26 are pressed with their one actuator end into the slots 31. For precise positioning, the spring leaf actuators 26—as in the exemplary embodiment of FIG. 3—can also be provided with lugs 32 at one end to provide for precise positioning of the spring leaf actuators 26 in the slots 31. The spring leaf actuators 26 are prevented from sliding out of the slots 31 by means of covering pieces, which are pressed into the slots 31 in a positively and frictionally engaging manner after the insertion of the spring leaf actuators 26.

Figure 4:
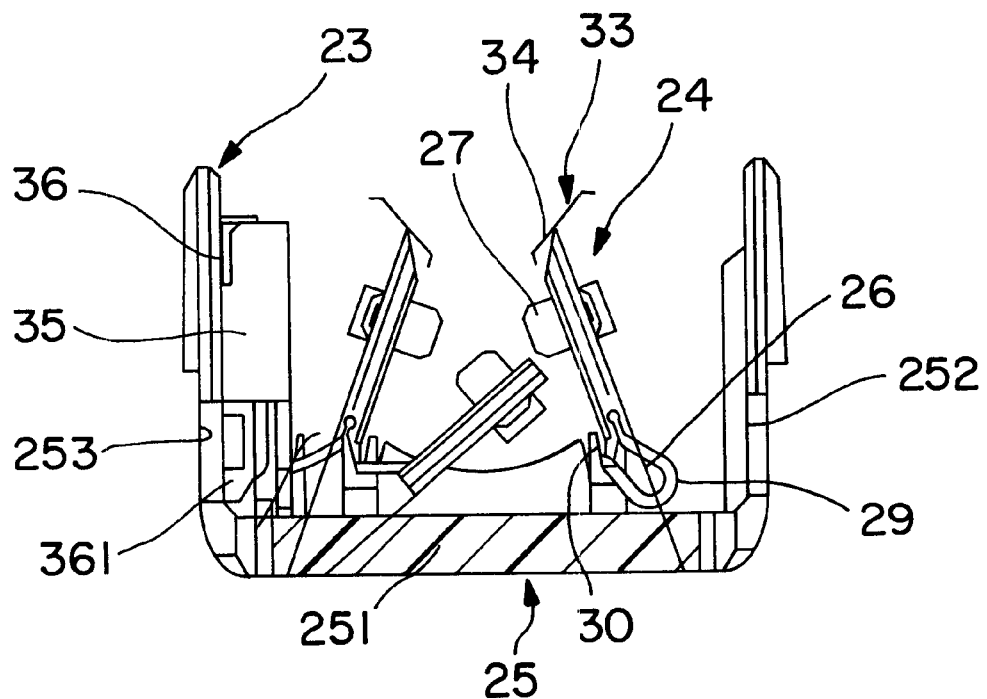

In the exemplary embodiment of FIG. 4, the spring leaf actuators 26 are embodied as insert pieces that are molded-in at the ends when the plastic carrying part 25 is injection molded.

Figure 5:
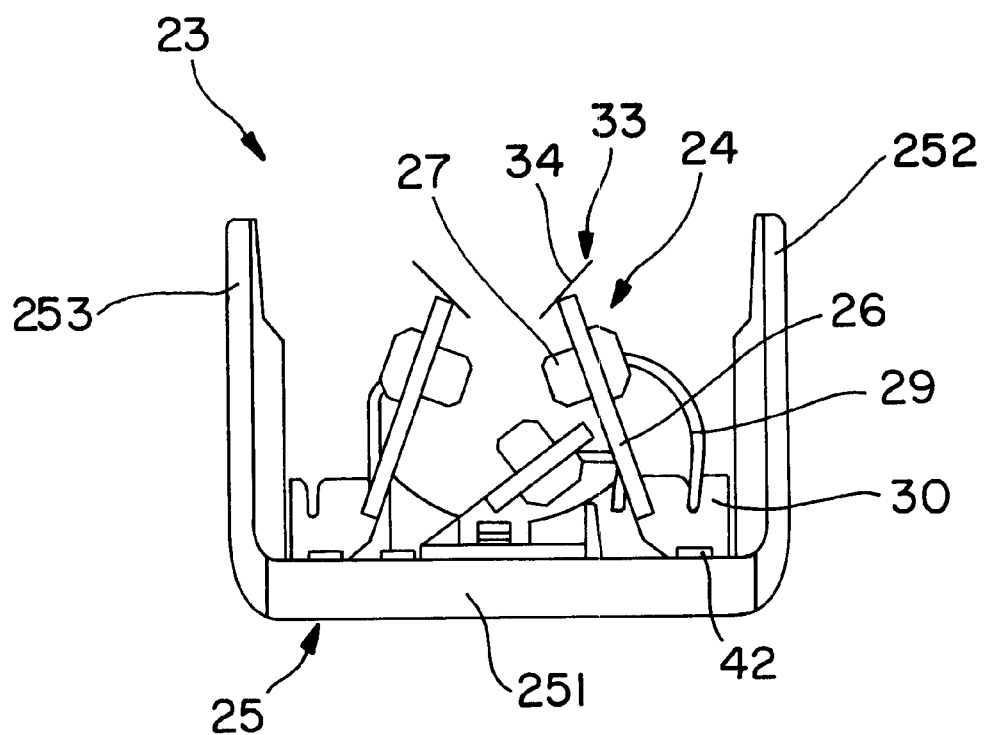

In the exemplary embodiment of FIG. 5, the actuator ends of the spring leaf actuators 26 are angled and fastened to the inside of the yoke 25 of the U-shaped carrying part 25. They can be fastened by means of ultrasonic welding, screw connection, or thermal caulking. In the latter case, positioning pins 42 are embodied on the carrying part 25 and the angled actuator ends of the spring leaf actuators 26 are placed onto these positioning pins 33 during the thermal caulking.

During the manufacture of the brush holder 23 according to FIG. 5, the spring leaf actuators 26 can be produced as individual parts and can be separately connected to the carrying part 25. In terms of assembly, it is advantageous to manufacture the spring leaf actuators 26 out of a single piece of spring steel sheet so that the spring leaf actuators are of one piece with one another and only after attachment to the carrying part 25, to separate the spring leaf actuators 26 from one another for which purpose dividing points are already provided in the spring steel sheet.

In all of the brush holders 23 according to FIGS. 3 to 5, the spring leaf actuators 26 of the two spring leaf actuators 26 are disposed opposite one another on the commutator 22 and have so-called assembly aids 33 which make it easier to slide the hammer brushes 24 onto the commutator 22 during assembly of the brush holder 23. These assembly aids 33, which are only schematically depicted in FIGS. 3 to 5, are comprised of clips 34 splayed outward from the end of the spring leaf actuators 26 which slide against the commutator circumference during assembly of the brush holder 23 and thus make it possible for the commutator 22 to easily spread apart the two hammer brushes 24 disposed opposite each other.

In the two exemplary embodiments of the brush holder 23 according to FIGS. 3 and 4, an additional pocket 35 is injection molded onto the carrying part 25, into which a thermal circuit breaker 36 is inserted, which is mounted on a grounding plate 361. It is possible to injection mold additional pockets onto the carrying part 25 for containing interference suppression elements (capacitor, throttle).

Figure 2:
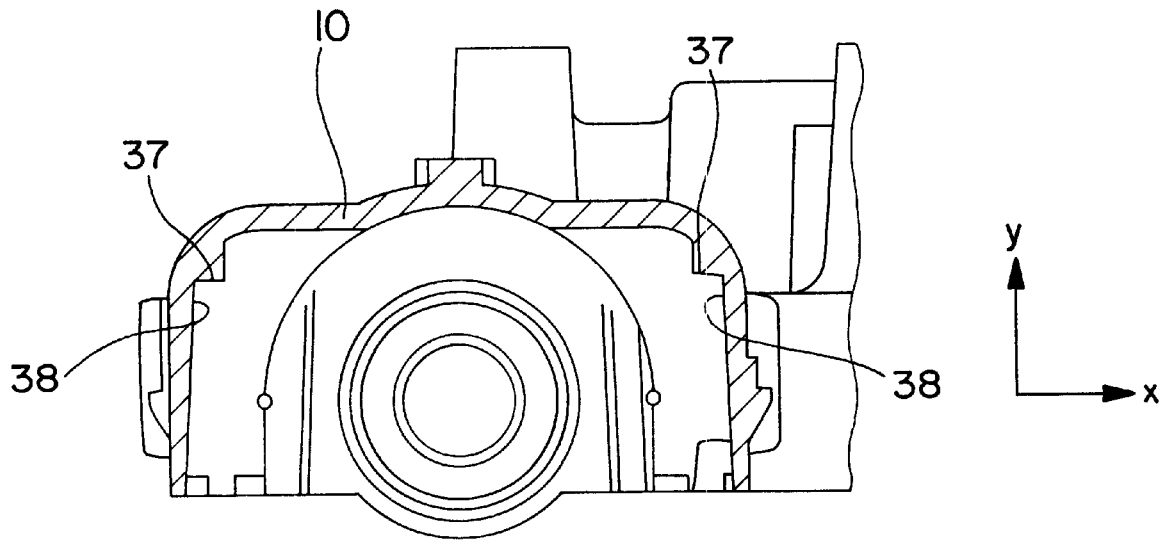
FIG. 2 shows a section through the empty transmission housing of the motor-and-gear assembly, along the line II—II in FIG. 1.
Figure 7:
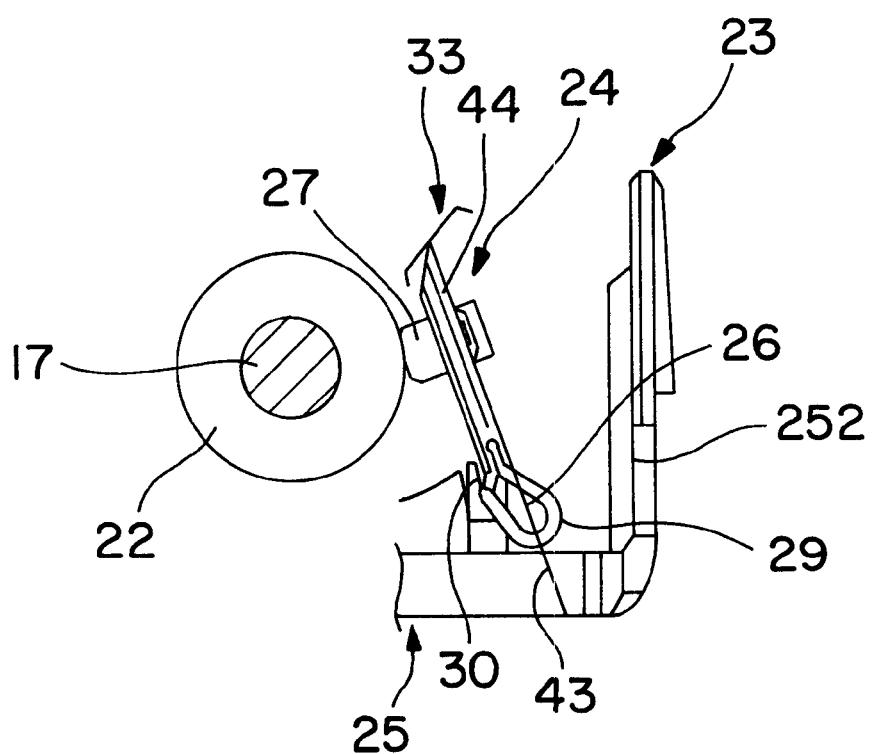
FIG. 7 illustrates the ends of a spring lever and a commutator on which a wiper body rests.

During the assembly of the motor-and-gear assembly, when the motor-and-gear assembly is end-mounted, the completed brush holder 23 is inserted into the transmission housing 10, radial to the rotor shaft 17, through the still-open housing opening 12 in the transmission housing 10, wherein the two opposing commutator brushes 24 slide against the commutator 22. In the end position of the brush holder 23, the carbon strips 27 of the two opposing hammer brushes 24 rest in a precise position on the circumference of the commutator 22 and also, the carbon strip 27 of the third hammer brush 24 is pressed in a precise position against the commutator circumference as shown more clearly in FIG. 7. The precise positioning of the brush holder 23 in the transmission housing 10 is provided for by positioning faces 37, 38 (FIG. 2) embodied in the transmission housing, which are adjoined in a positively engaging fashion by the front ends of the two arms 252 and 253 of the U-shaped carrying part 25. The two positioning faces 37 provide for a positioning of the brush holder 23 in the y-direction and the two positioning faces 38 provide for a positioning of the brush holder 23 in the x-direction of the y, x coordinate system shown in FIG. 2 so that the brush holder 23 is fixed in relation to the commutator 22 in two radial directions aligned at right angles to one another.

After the insertion of the brush holder 23 into the transmission housing 10, the housing opening 12 is closed as a last step by the placement and screwing of the housing cover 13. With an elastomer element 39 injection molded onto its inside pointing toward the interior of the housing, the housing cover 13 presses against the yoke 251 of the carrying part 25 and thus, together with the positioning faces 37, 38, fixes the brush holder 23 so that the brush holder cannot move in the transmission housing 10. This elastomer element 39 is part of a seal 40 that is made of rubber-like material injection molded onto the inside of the housing cover 13 and seals the housing opening 12 between the transmission housing 10 and the housing cover 13 in a watertight and dust-tight manner.

The foregoing relates to a preferred exemplary of embodiments of the A, invention, it being understood that other variants and embodiments thereof are possible within the spirit and scope of the invention, the latter being defined by the appended claims.

We claim:

1. An electric motor-and-gear assembly for driving vehicle aggregates comprising a transmission housing (10) including a housing opening (12) that is closed by a housing cover (13) when assembled for operation, a motor housing (11) attached to the transmission housing (10), a commutator motor (14) contained in the motor housing (11), said commutator motor includes an elongated rotor shaft (17), which rotor shaft has an axis and supports a commutator (22), wherein the elongated rotor shaft protrudes into the transmission housing (10), a brush holder (23) fixed within the transmission housing (10), which brush holder (23) supports at least two commutator brushes (24) that rest against the commutator (22) with a spring force, the brush holder (23) having a U-shaped carrying part (25), and the commutator brushes (24) each includes a spring leaf actuator (26) prestressed toward the commutator (22), each spring leaf actuator (26) including a first actuator end (43) and a second actuator end (44), wherein each first actuator end (43) is fixed to the carrying part (25), and each second actuator end (44) supports a sliding body (27) that rests against the commutator (22), each sliding body (27) being fixed to the second actuator end (44) and guided against the commutator (22) only by said second actuator end (44), wherein the brush holder (23) is inserted into the transmission housing (10) through the housing opening (12) radially to the commutator (22), and the transmission housing (10) having positioning faces (37, 38) oriented at right angles to each other, and said positioning faces also being oriented such as to face in directions which are radial to the axis of the elongated rotor shaft, whereby the carrying part (25) of the brush holder (23) is positioned properly in radial directions at right angles to each other in relation to the commutator (22) by means of the carrying part (25) engaging the positioning faces (37, 38).

2. The motor according to claim 1, wherein the carrying part (25) is fixed in the transmission housing (10) by means of the housing cover (13) that is placed onto the housing opening (12) upon assembly.

3. The motor according to claim 2, in which at least one elastomer element (39) is disposed between one side of the carrying part (25) oriented toward the housing cover (13) and an inside of the housing cover (13).

4. The motor according to claim 3, in which the at least one elastomer element is part of a seal (40) that is made of a flexible material and is injection molded onto the housing cover (13).

5. The motor according to claim 1, in which in order to fix the spring leaf actuators (26) to the carrying part (25), the carrying part (25) has slots (31) that feeds into one end, into which the actuator ends (43, 44) of the spring leaf actuators (26) are slid in a clamping fashion.

6. The motor according to claim 5, wherein the slots (31) in the carrying part (25) are aligned so that after their ends are slid into the respectively associated slot (31), the spring leaf actuators (26) are precisely positioned in relation to the commutator (22).

7. The motor according to claim 1, wherein the spring leaf actuators (26) are embodied as insert pieces that are molded-in at the ends during the production of the carrying part (25), which is embodied as an injection-molded plastic part.

8. The motor according to claim 1, wherein the actuator ends of the spring leaf actuators (26) are angled and are fastened to an inside of the carrying part (25) pointing toward a U-opening by a securing means.

9. The motor according to claim 8, in which the spring leaf actuators (26) are of one piece with one another and after attachment to the carrying part (25), are separated from one another, at prepared dividing points.

10. The motor according to claim 1, in which clips (28) are embodied on the spring leaf actuators (26) in order to fix sliding bodies (27) in a positively and frictionally engaging manner.

11. The motor according to claim 1, in which assembly aides (33) are embodied at free ends of the spring leaf actuators (26), and are of one piece with each spring leaf actuator (26) to make it easier to slide the spring leaf actuators (26) onto the commutator (22).

12. The motor according to claim 1, in which pigtails (29) for the sliding bodies (27) are fixed in clamping forks (30) embodied on the carrying part (25) and are of one piece with the carrying part.

13. The motor according to claim 1, in which a thermal circuit breaker (36) is clipped into the carrying part (25) and that the thermal circuit breaker (36) is affixed to a ground plate (361).

* * * * *

UNITED STATES PATENT AND TRADEMARK OFFICE
CERTIFICATE OF CORRECTION

PATENT NO. : 6,515,399 B1
DATED : February 4, 2003
INVENTOR(S) : Detlef Lauk et al.

It is certified that error appears in the above-identified patent and that said Letters Patent is hereby corrected as shown below:

<u>Title page,</u>
Item [75], please correct to read as follows:

-- [75] Inventors: Detlef Lauk, Renchen (DE); Ernst Fischer, Gernsbach (DE); Hansjoerg Karcher, Buehlertal (DE); Juergen Herp, Buehlertal (DE); Erik Maurer, Buehlertal (DE); Andreas Wiegert, Kappelrodeck (DE); Christian Schneider, Buehlertal (DE); Bernd Bock, Buehlertal (DE); Richard Hurst, Offenburg, (DE) --

Signed and Sealed this

Twenty-seventh Day of May, 2003

JAMES E. ROGAN
*Director of the United States Patent and Trademark Office*